July 6, 1943.  L. M. ELLISON  2,323,709
NON-PARALLAX POINTER
Filed Jan. 16, 1942
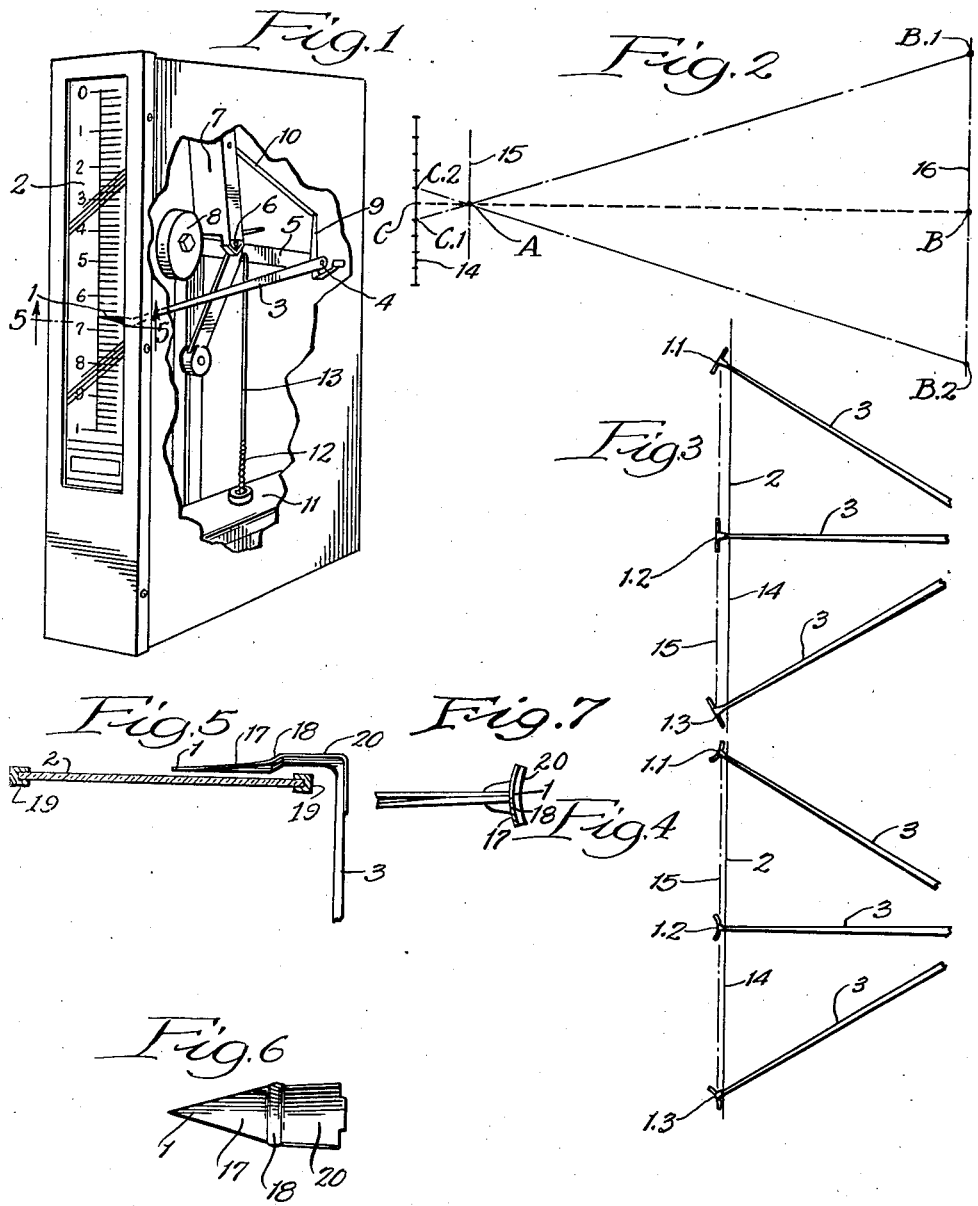
Inventor:
Lewis M. Ellison,
By Rummler Rummler & Davis,
Attorneys.

Patented July 6, 1943

2,323,709

UNITED STATES PATENT OFFICE 2,323,709

NONPARALLAX POINTER

Lewis M. Ellison, Winnetka, Ill.

Application January 16, 1942, Serial No. 427,005

7 Claims. (Cl. 116—129)

This invention relates to indicator mechanisms, and particularly of the type represented by draft gages where the position of a pointer travelling along the face of a dial may be read at a considerable distance from the indicating mechanism.

The main objects of this invention are to provide an improved form of pointer, especially adapted for use in connection with straight dials in gage mechanism where the pointer is carried by a rocking arm, and consequently is tilted transversely of its length to some degree as it travels along the dial.

A further object is to provide a pointer of this kind that may have considerable width so that its indication may be clearly read at a distance and may, nevertheless, be disposed extremely close to the face of the dial and for all practical purposes eliminate the chance of erroneous reading of the indication due to parallax when the dial and its indicator are viewed from a distance and the line of vision is at an acute angle to the face of the dial.

In the drawing:

Figure 1 is a perspective view of a gage of the general type to which this invention relates, the casing being partly broken away to disclose the operating mechanism.

Fig. 2 is a diagram illustrating the effect of parallax in the reading of the position of a pointer along a dial in an instrument in which the pointer is spaced away from the face of the dial.

Fig. 3 is a diagram illustrating how the use of a wide pointer increases the risk of error due to parallax in a mechanism where the pointer is carried by a swinging operating arm.

Figure 4 is a similar diagrammatic view illustrating how the pointer of the present invention may be mounted in closer proximity to the face of the dial to practically eliminate erroneous readings due to parallax.

Fig. 5 is a detail showing the relation of the improved pointer to the face of the dial, the latter being shown in section as on the line 5—5 of Fig. 1.

Fig. 6 is an enlarged face view of the improved pointer.

Fig. 7 is an edge view of the pointer and a part of its indicator arm, as it woould appear when viewed from the left of Fig. 5.

The device shown in Fig. 1 is a draft gage having a straight line movement of its pointer 1 controlled by an operating mechanism of the type covered by my Patent #1,857,367 for Pressure indicator, issued May 10, 1932. In this mechanism the pointer 1 lies close to the face of the indicator dial 2, which is uniformly graduated to indicate pressure. The pointer lies close to the face of the dial with its longitudinal dimension parallel with the graduations of the dial and is carried by an indicator arm 3 which moves in a plane at right angles to the face of the dial, being carried on a pivot 4 on the arm of a lever 5 fulcrumed at 6 on a frame member 7 and counterpoised by a weight 8.

Rigidly connected with the indicator arm 3 is a crank arm 9 which is pivotally connected to a link 10 for producing straight line movement of the pointer 1 vertically along the straight face of the dial. By "straight line movement" as herein employed is meant such movement of the pointer that it will travel a straight path, not only with respect to the plane of movement of the pointer 3, but also with respect to the plane of the face of the dial 2. That is to say, the spacing of the apex of the pointer away from the face of the dial remains practically constant throughout the entire range of movement of the pointer along the dial.

In the particular mechanism shown in Fig. 1, it will be understood that there is a motor mechanism of some kind that is sensitive to the pressures that are to be indicated by the movements of the pointer on the dial. This motor mechanism, indicated at 11 in Fig. 1, has an internal movable member connected by chain 12 and rod 13 with the lever 5, and is so related to the indicating mechanism that the movement of the pointer accurately indicates changes of pressures in units represented by the graduations on the dial.

Figure 2 illustrates diagrammatically the possibility of error due to parallax when the position of the pointer in such a mechanism is viewed from a considerable distance above or below the level of the indicator pointer. In this diagram, the dial is indicated by the line 14, the path of travel of the pointer is indicated by the line 15 and the distance of the observer's eye from the dial is indicated by the line 16. Thus, at any instant if the pointer be represented by the character A and be located at a distance from the face of the dial represented by the space between the lines 14 and 15, then an eye located at B on the same level with the pointer A would see the pointer opposed to the proper graduation C on the dial, but if the eye is anywhere above or below the level of the pointer A, as for example in the positions B—1 and B—2, it would see the pointer as if it were below or above the graduation C, as for example at the points C—1 and C—2, respectively. As the path of the pointer represented by the line 15 is brought closer to the face of the dial represented by the line 14, this error due to parallax is proportionately reduced.

In order that a pointer on a gage may be clearly seen so that its indication on the face of the dial may be clearly read at a considerable distance, it is essential that the pointer be of sufficient width.

In Fig. 3 there is illustrated diagrammatically the effect of widening the pointer in an instrument in which the path of travel of the pointer is a straight line parallel with the face of the dial, but in which the pointer is carried by a vertically swinging indicator arm as is the case in an instrument such as is illustrated in Fig. 1. In this view the path of travel of the middle point of the body of the pointer is indicated by the dotted line 15, and the plane of the dial is indicated by the line 2. Then, with a flat pointer the transverse or vertical elements of the pointer would be tilted with respect to the face of the dial 2 at any position other than when the indicator arm 3 is at right angles to the path of travel.

In the position indicated by the numeral 1—1, Fig. 3, the upper edge of the pointer is tilted toward the face of the dial and in the position indicated by the numeral 1.3 the lower edge of the pointer is tilted toward the face of the dial and in order that there may be clearance at all times and avoid friction it is necessary that the dial be spaced a distance back of the path 15 of the movement of the pointer as may be required by the angular throw of the indicator arm 3.

In accordance with the present invention, the shape of the pointer has been so arranged that the path of movement thereof along the face of the dial may be moved closer to the dial for the minimum of clearance that will avoid actual contact at any point within the range of travel of the pointer. In Fig. 4, it will be seen that the line 15, indicating the path of the travel of the medial longitudinal line of the pointer body along the face of the dial, may be much closer to the face of the dial than the spacing of the line 15 from the line 2 in Fig. 3.

In the improved form of pointer illustrated in Figs. 5, 6 and 7, the triangular outer end portion 17 is the only part of the pointer that is visible through the window in the casing. This part of the pointer is shown to be formed as if it had been cut from the surface of a cylinder; that is, the longitudinal elements of the inner surface of this pointer which is opposed to the face of the dial are straight and the transverse elements are arcs of a circle, bowed convexly toward the face of the dial. The body of the pointer is offset at 18 so as to clear the frame 19 which carries the dial 2, and there is a similar bowed body portion 20 extending to its connection with the indicator arm 3.

In Fig. 4 the improved pointer and its travel along the dial are represented diagrammatically, and it will be seen that its line of travel 15 is much closer to the face of the dial than is the case in Fig. 3.

It will be seen from Fig. 5 that the longitudinal elements of the pointer surface are parallel with the face of the dial and that the middle element of this surface runs to the apex of the pointer and may be so close to the face that parallax is practically eliminated.

Although but one specific embodiment of this invention is herein shown and described, it will be understood that details of the device shown may be altered or omitted without departing from the spirit of the invention as defined by the following claims.

I claim:

1. In a gage, a pivoted indicator arm, a pointer on the end of said arm disposed in substantially parallel relation to the pivotal axis of said arm, said pointer comprising a longitudinally tapered blade-like body of sheet material having straight longitudinal elements forming a surface tapered to a point, said elements also forming a symmetrically curved surface convex to said pivotal axis.

2. In a gage having a straight scale and an angularly swinging indicator arm controlled for approximately straight line movement along said scale, a pointer on said arm and overlying the face of said scale and comprising a wide blade-like body of sheet material tapered lengthwise to a point and being so formed as to present a curved surface which is convex to the face of said scale.

3. In combination, a planar scale, a blade-like pointer of sheet material overlying said scale, indicator mechanism comprising an indicator arm pivoted on an axis parallel with said scale and carrying said pointer, the surface of said pointer that faces said scale comprising a medial longitudinal element parallel with the plane of said scale, said surface being transversely bowed convexly to the face of said scale and having its lateral portions tapered to a point in said medial element.

4. In combination, a planar scale, a blade-like pointer of sheet material overlying said scale, indicator mechanism comprising an indicator arm pivoted on an axis parallel with said scale and carrying said pointer, a frame for said scale, the surface of said pointer that faces said scale comprising a medial longitudinal element parallel with the plane of said scale and offset to clear said frame and forming a surface tapered to a point in said medial element and convexly bowed to maintain a substantially small clearance between said pointer and scale in all angular positions of said indicator arm.

5. In a gage having a planar vertical scale dial with an indicator arm travelling in a vertical plane at nearly right angles to the scale dial and turnable on a horizontal axis, a blade-like pointer of sheet material extending horizontally across the scale dial and rigid on said indicator arm, said pointer having its rear surface that overlies said scale formed with a straight horizontal middle surface element and with its marginal portions bent away from the plane of the scale at both sides of said middle element, and tapered lengthwise to a point in said middle element.

6. In an indicator, a graduated scale of elongated strip form whose surface is longitudinally noncircular, a blade-like pointer of sheet material disposed across the strip, mechanism for moving the pointer along the scale and comprising a pointer-carrying arm mounted on a shiftable pivot and controlled to carry the pointer along the scale in a path substantially parallel therewith, the surface of said pointer that faces said scale being formed with its medial longitudinal element extending across the face of the scale and with marginal portions bent away from the surface of the scale at both sides of said medial element and tapered lengthwise to a point in said medial element.

7. In an indicator, a graduated scale of elongated strip form whose front surface is longitudinally noncircular, a blade-like pointer of sheet material disposed across the scale for movement along the scale mechanism for moving the pointer along the scale and comprising a pivoted arm and control means associated with said arm to move the pointer along said scale in a path substantially parallel therewith, the surface of said pointer that faces said scale being formed with its medial longitudinal element extending across the face of the scale and its marginal portions convexly bent away from the surface of the scale at both sides of said medial element, and the pointer being symmetrically tapered to a point in said medial line.

LEWIS M. ELLISON.